Dec. 28, 1937.                J. A. GOODWIN                2,103,718
                                 HORSESHOE
                            Filed March 1, 1937
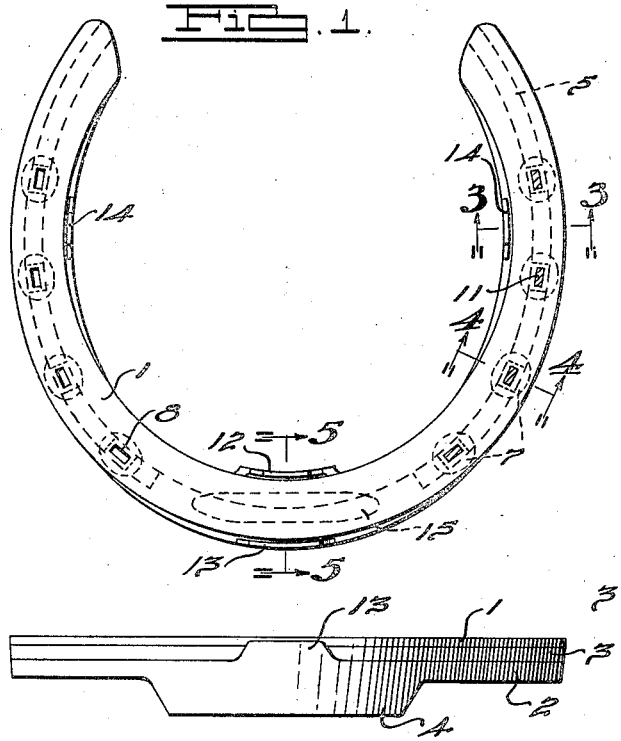
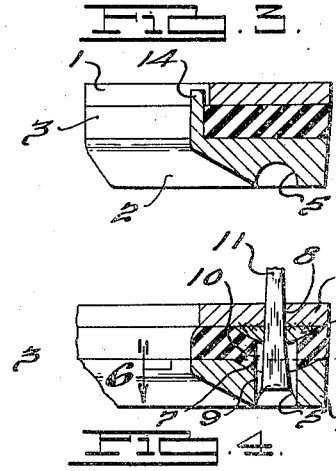
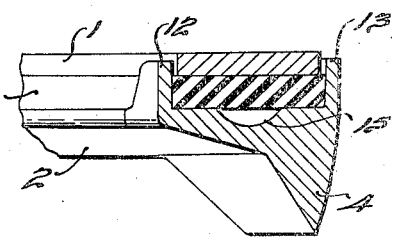
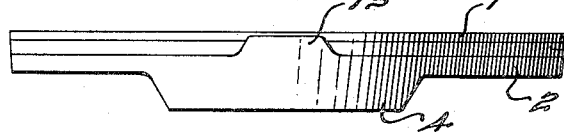
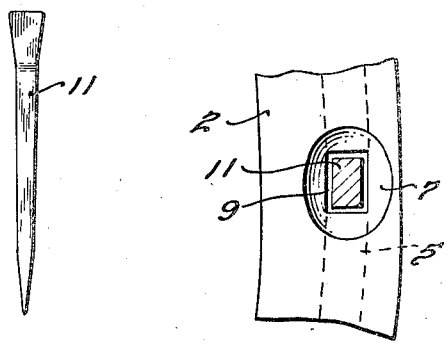
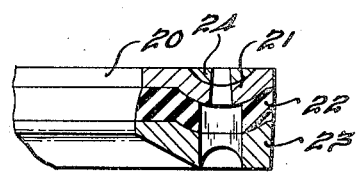
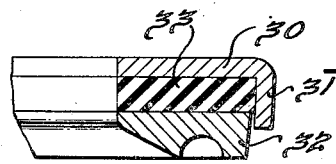
INVENTOR
Joseph A. Goodwin.
BY Harness, Dickey Pierce & Hann
ATTORNEYS.

Patented Dec. 28, 1937

2,103,718

UNITED STATES PATENT OFFICE 2,103,718

HORSESHOE

Joseph A. Goodwin, Lexington, Ky.

Application March 1, 1937, Serial No. 128,364

5 Claims. (Cl. 168—12)

This invention relates to horseshoes and particularly relates to horseshoes adapted for use on race horses.

Most of the injuries that occur to race horses arise from the terrific shock and strain to which their hoofs, ankles and legs are subject when running at high speed on hard or rough tracks and around curves. It is impossible to prevent a certain degree of roughness in race tracks due to the severe punishment they take from horses' hoofs and the smoothest tracks are actually rougher and more uneven than they appear. The severe sting or shock the hoofs and ankles receive produces pain, heat, spread of ordinary shoes causing spread of hoofs, unnatural bone growths and sore leg muscles. From running on circular tracks and uneven ground where the hoofs are at an angle to the horse's body, the horses receive bowed tendons and pull their leg ligaments and muscles.

Another common source of injury is shoe breakage. Racing shoes must be of light weight, which reduces their strength and renders them subject to breakage. When an ordinary racing shoe breaks, a nail may hold one end of a broken part, allowing the other end to fly outwardly and cut and often permanently injure the horse or other horses which the broken shoe may strike. Even if the shoe flies entirely free, a horse will very quickly spread and ruin its hoofs when running at high speed, and the lost shoe may strike another horse.

Accordingly, it is the object of this invention to provide an improved horseshoe which will overcome these defects and hazards and which will protect race horses against injury. In accordance with these objects there is provided a horseshoe of the type comprising a pair of spaced plates separated by and intimately bonded to an intermediate layer of rubber. The improved shoe cushions the jar and shock, tends to correct the angle assumed by the hoof when it strikes uneven ground or when the horse is running on a curve, insulates the hoof against heat and is very much less subject to breakage or accidental loss or removal than the ordinary type of shoe.

Referring to the drawing wherein like numerals are applied to like parts in the several views:

Figure 1 is a plan view of the horseshoe;

Fig. 2 is a front elevation of the shoe;

Fig. 3 is a section taken on the line 3—3 of Fig. 1;

Fig. 4 is a section taken on the line 4—4 of Fig. 1;

Fig. 5 is a section taken on the line 5—5 of Fig. 1;

Fig. 6 is a section taken on the line 6—6 of Fig. 4;

Fig. 7 shows a section corresponding to the section shown in Fig. 4, but of a modified form of the shoe construction;

Fig. 8 shows a section similar to the section shown in Fig. 3, but of a modified feature of the construction; and Fig. 9 is an elevational view of the preferred form of nail used with this horseshoe.

The improved shoe comprises a flat top plate 1 preferably formed of sheet metal in the conventional shape of a horseshoe, a bottom plate 2, and an intermediate layer of rubber 3 which is intimately bonded by vulcanizing to the upper and lower plates. The bottom plate 2 is provided with a conventional toe calk 4 and the usual nail groove 5 and is generally similar in construction to conventional horseshoes, except for its reduced thickness and weight and the provision of certain novel features hereinafter pointed out.

It is one of the principal objects of the invention to provide a shoe in which the shocks incident to the striking of the bottom plate against the ground, including both the direct compression shocks and lateral shocks against the bottom plate, are cushioned by the rubber layer and hence not transmitted directly to the top plate. Accordingly the shoe is secured to the hoof solely through the top plate in the manner best shown in Figure 4. It will be noted that the under side of the top plate is provided with a plurality of oval shaped bosses 6 and that the bottom plate is provided with similar cooperating recesses 7 and that the nail holes 8 in the top plate pass through the centers of the bosses 6 while the nail holes 9 in the bottom plate are centered in the recesses 7. The rubber layer 3 is initially a flat sheet, with the result that when it is vulcanized to the surfaces of the top and bottom plates, it is forced into the recesses 7 by means of the bosses 6 until it assumes the form shown in Figure 4. The bosses 6 and recesses 7 cooperate with the rubber layer to provide resistance to relative lateral movement between the top and bottom plates in their own planes. This is important inasmuch as an excess of relative lateral movement between the top and bottom plates will give the horse a sense of insecurity which will interfere with its running. At the same time, the construction permits a certain amount of relative lateral movement sufficient to reduce the shock upon the horse's hoof incident to lateral forces acting against the bottom plate of the shoe.

The nail holes 8 are rectangular in cross section and are provided with the usual taper to receive and lock upon a tapered horseshoe nail 11. The openings 9 and 10 in the lower plate and rubber layer, respectively, are likewise rectangular in cross section, as best shown in Figure 6, but are of substantially greater dimensions than the dimensions of the head of the nail 11. While the horseshoe of this invention may be fixed to the horse's hoof by any desired type of nail, including the conventional horseshoe nails now in use, it is preferred to use a somewhat modified form of nail, as best shown in Figs. 4 and 9. This nail is provided with a head formed by an outwardly flaring taper on three sides, as in the conventional horseshoe nail, but the angle of this taper is greatly reduced in the manner shown in the drawing. Accordingly, the nail head will wedge into the opening in the upper plate and lock thereto. It is apparent, therefore, that the shoe is secured to the horse's hoof by means of nails engaging only the top plate and the bottom plate is free to move laterally with respect to the top plate to a substantial extent without directly contacting the head of the nail.

While it is essential that the upper and lower plates of the shoe be free to move laterally with respect to each other to a limited extent, it is necessary to provide a positive limit upon such relative lateral movement in order that the horse will not have a sense of insecurity and in order to prevent a separation of the upper and lower plates due to violent lateral shocks. Accordingly, there is provided upon the bottom plate 2 at the front end thereof a pair of upstanding lugs or flanges 12 and 13 which extend upwardly upon opposite sides of the forward portion of the top plate in spaced relation to the latter, as best shown in Figure 5. In addition, the bottom plate is provided with a pair of similar lugs or flanges 14 at the inner sides of the legs of the shoe adjacent the rear end thereof and these lugs likewise extend upwardly adjacent the inner sides of the top plate 1, as best shown in Fig. 3.

The lugs 12, 13, and 14 are spaced from the edges of the top plate sufficiently to permit the desired amount of relative movement between the top and bottom plates, but they are effective to positively limit such lateral movement to the maximum desired amount. This spacing is so chosen relative to the spacing between the nail head and the openings 9 and 10 that the bottom plate will never contact the nail heads, and hence will not tend to loosen the nail. The rearward lugs 14 are positioned at the inner sides of the top plate in order that they will serve the further important function of resisting any tendency of the lower plate to spread when the horse is running.

It is important in the construction of any horseshoe that it be perfectly balanced about a central transverse axis and hence it is desirable to remove metal from certain portions of the shoe to effect this balance. The present invention lends itself readily to this expedient, as is shown best in Figures 1 and 5, wherein is shown a transverse groove 15 cut into the bottom plate to reduce the weight of the front end thereof. It will be noted that the provision of this groove will not interfere with the operation of the shoe.

In Figure 7 is shown an alternative cheaper construction which will accomplish the same results as that shown in Figure 4. In this modification of the invention, the top plate 20 is formed of sheet metal in which the bosses 21 are formed by a stamping operation. The bosses so formed cooperate with the rubber layer 22 and the bottom plate 23 of the shoe in the manner previously described. In addition, to provide additional thickness for wedging against the sides of the tapered nail, the recesses formed in the upper side of plate 20 are filled by a body of metal 24. This may be done in any desired manner, as by welding.

The lugs 12, 13, and 14, as shown in Figures 1, 2, 3, and 5, may be formed upon the bottom plate in any desired manner. Thus, they may be forged integrally with the bottom plate or welded thereto after the bottom plate has been formed. A somewhat simpler and less expensive arrangement for the lugs 14 is shown in Figure 8.

In that figure, the top plate 30 is formed of sheet metal and the lugs or flanges 31 are struck downwardly from the same into spaced relation with respect to the outer side of the bottom plate 32. It will be noted that in this case the lugs 31, which correspond to the lugs 14 shown in Figure 1, are formed at the outer side of the shoe to prevent spreading of the lower plate 32. In this construction, the upper plate 30, the rubber layer 33, and the bottom plate 32 cooperate with each other in the manner previously described.

It will be understood that the rubber and metal layers of the shoe will be bonded and vulcanized together by any of the preferred methods now known. One such method involves etching the metal surface, applying uncured rubber with or without the use of a rubber cement, and vulcanizing the entire shoe under heat and pressure. This results in an intimate bond of great strength.

It will be observed that in accordance with the present invention, all of the forces striking against the shoe are cushioned by the rubber layer before they are transmitted to the top plate, which alone is secured to the horse's hoof. Accordingly, no forces, either direct compression forces or lateral forces, will be transmitted directly to the hoof. On the other hand, the shoe is so designed that it offers relatively high resistance to lateral displacement between the two metal layers of the shoe and in addition there is provided a positive abutment to limit such relative movement to the desired maximum amount.

While several embodiments of the invention are shown, it is believed to be apparent that alterations thereof may be made within the spirit of the invention described herein and within the scope of the appended claims.

I claim:

1. A horseshoe comprising a hoof contacting metal plate having nail holes for attachment to a horse's hoof, a ground contacting metal plate having openings opposite said nail holes and of larger size than the head of a horseshoe nail whereby the heads of the horseshoe nails will seat against the hoof contacting plate without engaging said ground contacting plate, and means permanently connecting said plates in superimposed relation for relative movement laterally as well as perpendicularly of the plates, said means constituting in its entirety a rubber layer between and bonded to said plates.

2. A horseshoe comprising a hoof contacting metal plate having nail holes for attachment to a horse's hoof, a ground contacting metal plate having openings opposite said nail holes and of larger size than the head of a horseshoe nail whereby the heads of the horseshoe nails will seat against the hoof contacting plate without engaging said ground contacting plate, means permanently connecting said plates in superimposed relation for relative movement laterally as well as perpendicularly of the plates, said means constituting in its entirety a rubber layer between and bonded to said plates, and means for positively limiting the relative lateral movement between said plates to a substantial but fixed amount.

3. A horseshoe comprising a hoof contacting plate, a ground contacting plate, and an intermediate layer of rubber bonded to said plates and constituting the sole connection therebetween, one of said plates having a recess and the other plate having a portion projecting toward said recess, said rubber layer having a portion which is deflected into said recess by said projection when the shoe is assembled to increase the resistance to lateral movement between said plates.

4. A horseshoe comprising an upper plate, a ground contacting plate, and an intermediate layer of rubber bonded to said plates, said upper plate being provided with nail holes having cooperating downwardly projecting bosses surrounding the same, and said bottom plate being provided with openings of larger size than the nail heads and having recesses surrounding the same, said recesses being adapted to receive those portions of the rubber layer which are forced downwardly by the bosses on the top plate.

5. A horseshoe comprising an upper plate, a ground contacting plate, an intermediate layer of rubber bonded to said plates, said upper plate being provided with nail holes having cooperating downwardly projecting bosses surrounding the same, and said bottom plate being provided with openings of larger size than the nail heads and having recesses surrounding the same, said recesses being adapted to receive those portions of the rubber layer which are forced downwardly by the bosses on the top plate, and means for positively limiting relative lateral movement between the plates without preventing such movement.

JOSEPH A. GOODWIN.